United States Patent [19]
Daly et al.

[11] Patent Number: 5,872,842
[45] Date of Patent: Feb. 16, 1999

[54] UNBALANCED RINGING USING A BALANCED RINGING GENERATOR OF A SUBSCRIBER LINE INTERFACE CIRCUIT

[75] Inventors: William G. Daly; Steven L. Caine, both of Lawrenceville, Ga.

[73] Assignee: Scientific-Atlanta, Inc., Norcross, Ga.

[21] Appl. No.: 774,228

[22] Filed: Dec. 27, 1996

[51] Int. Cl.⁶ .................................................. H04M 3/00
[52] U.S. Cl. .................... 379/399; 379/377; 379/398; 379/413
[58] Field of Search .................... 379/399, 398, 379/394, 387, 27, 1, 2, 252, 382, 405, 251, 253, 255, 377, 372, 373, 322, 413

[56] References Cited

U.S. PATENT DOCUMENTS

| | | | |
|---|---|---|---|
| 4,468,541 | 8/1984 | Cohen | 379/393 |
| 4,860,332 | 8/1989 | Chism | 379/27 |
| 4,922,517 | 5/1990 | West, Jr. et al. | 455/426 |
| 4,996,702 | 2/1991 | Gray | 379/27 |
| 5,140,631 | 8/1992 | Stahl | 379/377 |
| 5,329,585 | 7/1994 | Susak et al. | 379/399 |
| 5,422,949 | 6/1995 | Tsukagoshi | 379/399 |
| 5,515,417 | 5/1996 | Cotreau | 379/413 |
| 5,515,434 | 5/1996 | Cotreau | 379/399 |
| 5,517,565 | 5/1996 | Cotreau | 379/252 |
| 5,521,974 | 5/1996 | Hayashi et al. | 379/381 |
| 5,544,241 | 8/1996 | Dibner et al. | 379/373 |
| 5,619,567 | 4/1997 | Apfel | 379/413 |
| 5,659,570 | 8/1997 | Cotreau et al. | 379/412 |
| 5,694,465 | 12/1997 | Apfel | 379/377 |
| 5,706,336 | 1/1998 | Kikinis | 379/93.01 |

OTHER PUBLICATIONS

Bellcore Technical Requirement Publication, TA–NWT–000909 Issue 2, Dec. 1993, Section 4, "Generic Requirements and Objective for Fiber in the Loop System".

Bellcore Technical Requirement Publication, TR–NWT–000057, Issue 2, Jan. 1993, "unctional Criteria for DLC Systems".

*Primary Examiner*—Harry S. Hong
*Assistant Examiner*—Jacques M. Saint-Surin
*Attorney, Agent, or Firm*—Kenneth M. Massaroni; Hubert J. Barnhardt III; Kelly A. Gardner

[57] ABSTRACT

A communication loop using a subscriber line interface circuit (SLIC) is modified such that it can operate in unbalanced ringing environments as well as balanced ringing environments. This is accomplished by grounding the tip lead of a telephone instrument and creating an open circuit at the tip lead of the SLIC. The ring lead of the telephone instrument and the ring lead of the SLIC are electrically connected, and an AC voltage applied to the ring lead by the SLIC is increased. A power supply is connected to the SLIC and biased to provide the increased AC voltage on the SLIC ring lead while the average voltage on the SLIC tip lead is maintained substantially at ground. The result of this circuitry is a trapezoidal signal meeting the amplitude, loading and crest factor requirements of Bellcore Technical Requirement Publications TA-NWT-000909 and TR-NWT-000057.

11 Claims, 2 Drawing Sheets

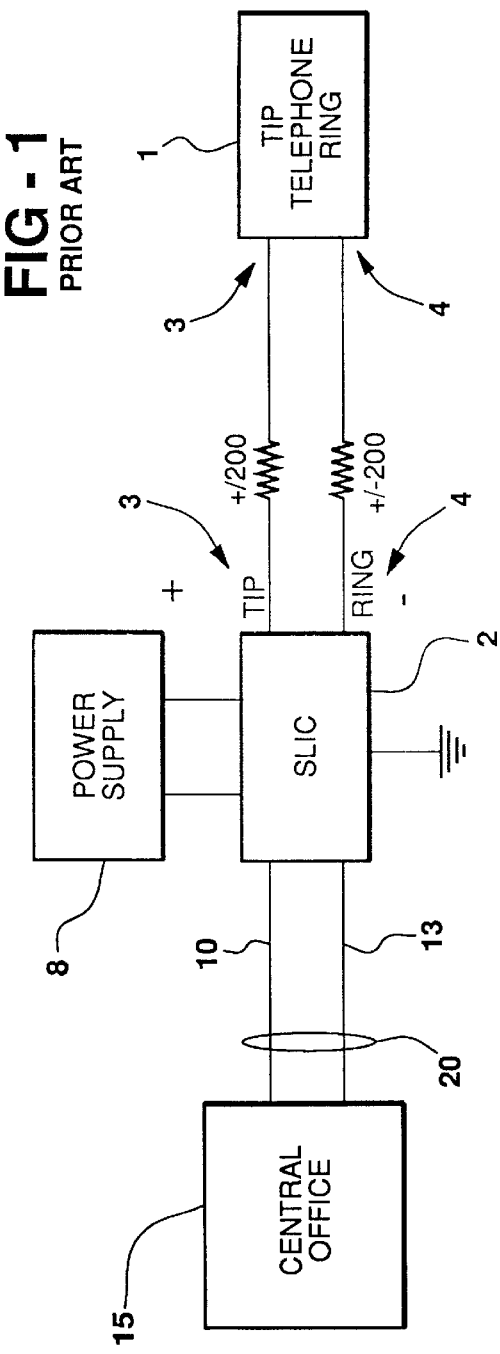
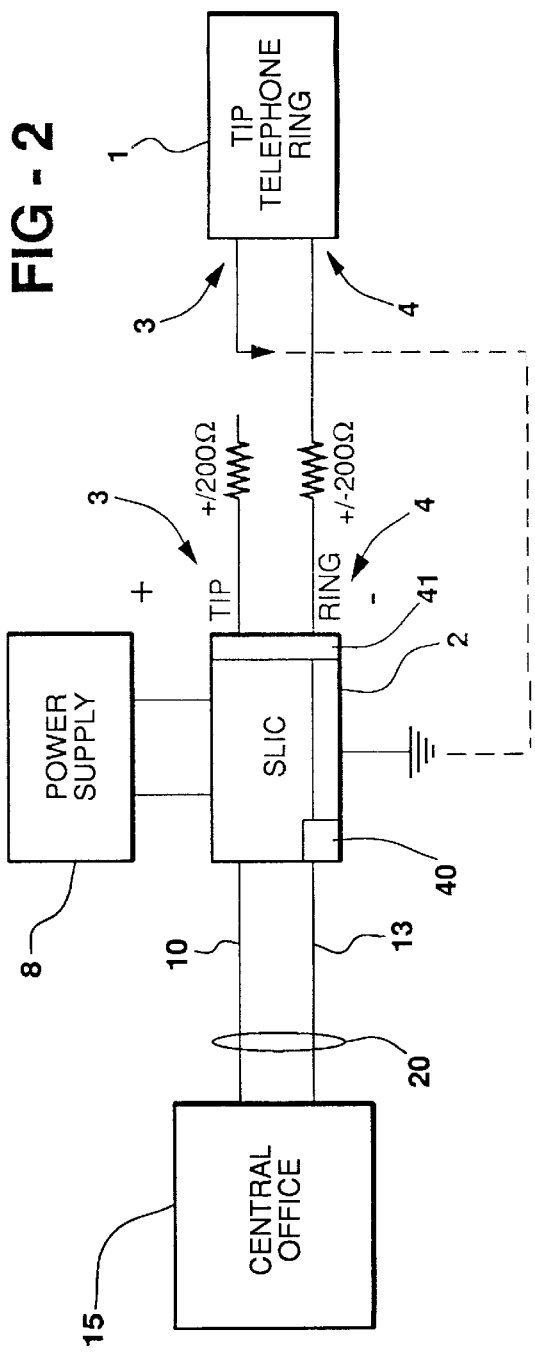

UNBALANCED RINGING USING A BALANCED RINGING GENERATOR OF A SUBSCRIBER LINE INTERFACE CIRCUIT

TECHNICAL FIELD

The present invention is generally directed to a subscriber loop circuit between a telecommunication switching center and a subscriber line circuit using a subscriber line interface circuit for a telephone network and more particularly, to a method, apparatus, and system for modifying the conventional use and programming of a high voltage subscriber line interface circuit intended for a balanced ringing telephone environment adapted for use in an unbalanced telephone ringing environment.

BACKGROUND OF THE INVENTION

Known subscriber line interface circuits (SLIC) are found in the central office of a telephone or telecommunication network wherein a function of the SLIC is to forward signals to and from the telephone switching network of the central office exchange from and to a plurality of an analog telephone line subscribers. Analog signals are returned by the plurality of subscribers via subscriber stations or telephone instruments at remote locations from the telephone station. The SLIC is connected to the telephone instrument through tip and ring leads which form a communication loop.

Another function of the SLIC is to supply power to a subscriber station and to transmit and receive voice signals between the digital switching network and the subscriber station. These circuits, which serve to connect the subscriber to a telephone exchange, typically include a current detector which performs several functions including detection of the subscriber going off-hook during ringing. In particular, when the subscriber is being called, alerting ringing signals (typically at 50 Hz in the U. S.) from the central office exchange are applied to the subscriber loop to operate the telephone ringer. When the subscriber goes off-hook, a DC loop current changes and the resulting loop current change is detected by the central office exchange to interrupt the ringing signals in the loop. Other features of the SLIC are battery feed, over voltage protection, ringing, signaling, hybrid, and timing.

Presently known techniques for a ringing system include using external ringing generators for balanced and unbalanced ringing or employing integrated ringing generators. However, integrated ringing generators are either integrated in the SLIC circuitry and dedicated to ringing or coupled to a SLIC having only the ability to provide balanced ringing.

When a telephone current loop carries a voice signal, the signal is generally on the order of three volts in amplitude, requiring current on the order of four milliamps in amplitude, having a bandwidth of up to 16 kHz. However, a typical ringer signal may have voltage amplitudes which may exceed 150 volts, current amplitudes up to 200 ma, and a bandwidth of 75 Hz. Combining the requirements of the two types of signals, voice signals and ringer signals, yield a requirement that the circuit between the SLIC and the telephone must function as a two-channel multiplexer switch. Known techniques such as the one described in U.S. Pat. No. 5,517,565 entitled "Integrated Ringer Relay Circuit and Method,"incorporated herein by reference in its entirety, couple a SLIC and a ringer signal to a telephone system while maintaining the isolation of the two components. This arrangement enhances the quality of the voice signal without the use of relays.

Today, the telephony ringing signal requirements are determined by two factors, the market in which the telephone ringing system is to be used and the application of the ringing system. The European market uses what is known as balanced ringing, while the U.S. market uses unbalanced ringing. Balanced ringing typically requires sine wave signals applied to the tip lead and the ring leads 180 degrees out of phase. The ring lead typically has a negative offset and the tip lead has a positive offset with the net DC value of the complementary signal being zero while the AC component may be as high as 85 Vrms. In the U.S. market, the average voltage carried on the tip lead is substantially ground while the ring lead carries AC and DC signals to affect an unbalanced telephone loop circuit.

SUMMARY OF THE INVENTION

The present invention is directed to a system, method and apparatus for employing a subscriber interface line circuit in an unbalanced ringing system. More particularly, the present invention is described in relation to a subscriber line interface circuit which is normally implemented in a balanced ringing environment, being utilized in an unbalanced ringing system for short loop applications. To this end, a subscriber line interface circuit has a tip lead and a ring lead which are adapted to be connected to the tip lead and ring lead of a telephone instrument in order to signal a user of an incoming call and also for the user to speak to a called or calling party. The tip lead of the subscriber line interface circuit is opened and the tip lead of the telephone instrument is connected to ground. The system includes a power supply for supplying voltage to the subscriber line interface circuit's ring and tip lead to emulate a balanced ringing system.

BRIEF DESCRIPTION OF THE DRAWINGS

The invention will be described in detail herein with reference to the following figures in which like reference numbers refer to the elements, and wherein:

FIG. 1 is a block diagram of a prior art balanced ringing system using a subscriber line interface circuit;

FIG. 2 is a block diagram of an unbalanced ringing system using a subscriber line interface circuit.

DETAILED DESCRIPTION OF PREFERRED EMBODIMENTS

Figure 3:
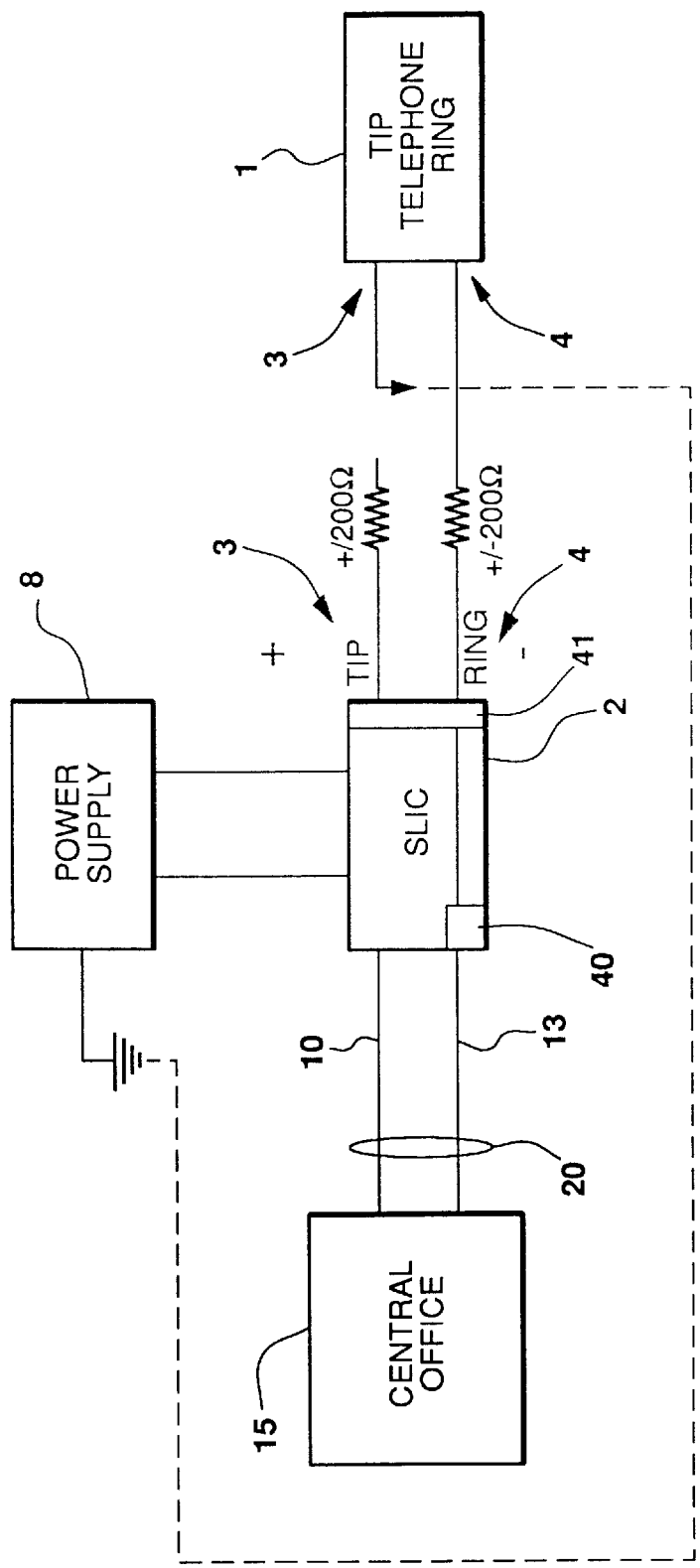
FIG. 3 is block diagram of another unbalanced ringing system using a subscriber line interface circuit in accordance with the present invention.

FIG. 1 is a block diagram of a known balanced ringing system using a subscriber interface line circuit (SLIC). A SLIC 2 may be electrically connected to a telephone instrument 1 through tip and ring paths 3 and 4 respectively and via a cable pair 20 to central office 15. Cable pair 20 traditionally refers to a copper wire pair. Today, the cable pair 20 may comprise a channel of optical fiber cable such as a distribution network. In this balanced ringing system, a sine wave signal is applied to the tip lead 3 and the ring lead 4 of the SLIC 2, via power supply 8, wherein the voltage applied to ring lead 4 is 180 degrees out of phase with respect to the voltage applied to the tip lead 3. The ring lead 4 typically has a negative DC offset and the tip lead 3 has a positive DC offset. The total DC value of this complementary signal is zero while the AC component may be as high as 85 Vrms.

As described in U.S. Pat. No. 5,329,585 entitled "Subscriber Interface Circuit for Controlling AC an DC Output Impedance," incorporated herein by reference in its entirety, SLIC 2 exchanges voice and data signals with central office 15 via terminals 10 and 13, while sending and receiving telephone signals modulated on 48 VDC over tip and ring leads 3 and 4. For example, a telephone user may transmit telephone signals via telephone 1, through the tip and ring leads 3 and 4 and terminals 10 and 13 to central office 15, where the voice information is switched by the telephone switching equipment at central office 15. The signal is further routed to another SLIC (not shown) for further processing. The SLIC 2 further establishes predetermined AC and DC termination impedances on tip and ring leads 3 and 4 when transmitting voice signals. SLIC 2 sets a constant current flow through the tip and ring leads 3 and 4 when a telephone 1 is off hook.

FIG. 2 is a block diagram depicting the elements of a preferred embodiment of the present invention. In FIG. 2, a SLIC 2, or a "high voltage" SLIC is electrically connected to a telephone 1 through a ring lead 4. The SLIC 2 may have an internal ringing generator 40, or an external generator (not shown) may be provided. The SLIC 2 also has a switch 41 for applying the ringing signal produced by ringing generator 40 to the tip lead 3 and ring lead 4 of the SLIC. In this unbalanced ringing system, the tip lead 3 at the telephone instrument is grounded and the ring lead 4 receives the ringing signal generated by the SLIC 2 and provided at the SLIC ring lead. To compensate for the unbalanced subscriber line interface circuit and deliver the required ringing amplitude, the power supply's voltage applied to the SLIC 2 is increased. The power supply is biased so that the average voltage of the SLIC's tip lead is substantially ground. The single ended ring lead signal has a negative DC potential and an AC ringing signal component which exceeds 40 Vrms at the telephone instrument after accounting for loading and line drops. The high voltage SLIC 2 is implemented in this system to withstand the excess voltage required to drive the single ended ring lead signal. By doubling the ringing signal AC voltage at the SLIC's ring lead 4 and grounding the telephone's tip lead 3, the system manipulates the SLIC 2 into working in an unbalanced ringing system. Moreover, SLIC 2 is earth grounded to complete the communication loop to telephone 1

FIG. 3 illustrates an alternative embodiment, wherein the power supply is earth grounded to complete the communication loop. This system can also be implemented in a short loop communication wherein the source voltage does not have to be very high to maintain 40 Vrms at the end of a loop cable having a 5 ringer equivalent number (ren) load as specified by the requirements of Bellcore Technical Requirement Publication TA-NWT-000909, Issue 2, December 1993, Sections 4, "Generic Requirements and Objectives for Fiber in the Loop System", and Bellcore Technical Requirement Publication TR-NWT-000057, Issue 2, January 1993, "Functional Criteria for DLC Systems".

Although a preferred embodiment of this invention has been described in detail therein with reference to the accompanying drawing, it is to be understood that the invention is not limited to this illustrative embodiment, and that the various changes and modifications may be affected therein by one skilled in the art without departing from the scope or true spirit and full scope of the invention as defined in the appending claims.

We claim:

1. A circuit for a telephone system producing ringing in an unbalanced subscriber loop comprising:
   a subscriber line interface circuit (SLIC) having a tip lead and a ring lead; and
   a telephone instrument having a tip lead and a ring lead where said telephone instrument ring lead is coupled to said subscriber line interface circuit ring lead and said telephone instrument tip lead is coupled to ground.

2. The circuit of claim 1, wherein the SLIC includes:
   a ringer generator providing a ringing signal based on a control signal; and
   a switch for applying said ringing signal to said tip lead and said ring lead of said subscriber line interface circuit.

3. The circuit according to claim 2, wherein a voltage on said SLIC ring lead has an AC component that exceeds 40 Vrms when said ringing signal is present.

4. The circuit according to claim 1, wherein said SLIC ring lead is electrically connected to said telephone instrument ring lead and said circuit is completed by coupling said SLIC to said ground.

5. The circuit according to claim 4, wherein said circuit forms a communication loop from a ground connection of the SLIC, through the SLIC, to the SLIC ring lead, to the telephone instrument ring lead, through the telephone instrument, to the telephone instrument tip lead, to ground.

6. The circuit according to claim 5, wherein said communication loop is a short loop characterized by a ringing voltage applied to the SLIC ring lead producing at least 40 Vrms at the telephone instrument ring lead when the telephone instrument has a 5 ren load.

7. The circuit according to claim 5, wherein said communication loop further comprises a resistive load coupled between the SLIC and the telephone instrument.

8. The circuit according to claim 1, wherein said subscriber line interface circuit is a high voltage subscriber line interface circuit.

9. The circuit according to claim 1, wherein said SLIC ring lead has a negative offset with respect to said ground.

10. The circuit according to claim 1, further including power supply connected to the SLIC and biased so that a voltage at the SLIC tip lead is substantially zero with respect to said ground.

11. A method for producing unbalanced ringing comprising:
   coupling a telephone instrument tip lead to a ground;
   creating an opened circuit at a SLIC tip lead; and
   coupling a subscriber line interface circuit ring lead to a telephone instrument ring lead.

* * * * *